United States Patent
Stolpa

[15] 3,676,468
[45] July 11, 1972

[54] PREPARATION OF FACTICE-LIKE PRODUCTS

[72] Inventor: Gerhard Stolpa, Hilden, Germany

[73] Assignee: Henkel & Cie, GmbH, Dusseldorf, Germany

[22] Filed: April 23, 1970

[21] Appl. No.: 29,732

Related U.S. Application Data

[63] Continuation of Ser. No. 612,789, Jan. 31, 1967, abandoned.

[30] Foreign Application Priority Data

March 26, 1966 Germany..............................H 58924

[52] U.S. Cl............................................................260/403
[51] Int. Cl..........................................A23j 7/00, C07f 9/02

[58] Field of Search...............................................260/403

[56] References Cited

UNITED STATES PATENTS

| | | | |
|---|---|---|---|
| 2,185,967 | 1/1940 | Priester.................................. | 260/403 |
| 2,345,734 | 4/1944 | Dickey et al........................... | 260/403 |
| 2,386,250 | 10/1945 | McNally et al. ....................... | 260/403 |

*Primary Examiner*—Elbert L. Roberts
*Attorney*—Hammond & Littell

[57] ABSTRACT

Process for the preparation of factice-like products from oxidized polymers of esters of unsaturated fatty acids and/or resinic acids with polyols reacted with a phosphorus halide and products produced therein having fire-resistant properties.

4 Claims, No Drawings

3,676,468

PREPARATION OF FACTICE-LIKE PRODUCTS

PRIOR APPLICATION

This application is a streamlined continuation application of copending application Ser. No. 612,789 filed Jan. 31, 1967, now abandoned.

PRIOR ART

Factices produced by the reaction of sulfur or sulfur chloride with unsaturated oils such as rapeseed oil, castor oil or mineral oils are known. Also, in German published Pat. application No. 1,165,866, solid, factice-like products are prepared by the reaction of hydroxy carboxylic acid esters such as ricinoleic acid triglyceride with silicon tetrachloride, titanium tetrachloride or stannous tetrachloride, but if a phosphorus halide is substituted for one of the said tetrachlorides, only liquid products with inadequate properties are obtained.

German published Pat. application No. 1,081,876 and East German Pat. No. 25,736 disclose phosphoric fatty acid derivatives obtained by reacting phosphorus trichloride or phosphorus oxychloride with epoxidized unsaturated oils resulting in more or less viscous oils having a relatively low phosphorus content and no solid, factice-like products are obtained. Also, J. Amer. Chem. Soc., (Vol. 63, 1941, p. 3,450), discloses the gelatinization of tung oil by slow reaction in the presence of phosphoric trichloride, but the said trichloride acts only as a polymerization catalyst and does not enter into a chemical combination with the tung oil.

OBJECTS OF THE INVENTION

It is an object of the invention to provide a novel process for the preparation of factice-like products containing phosphorus.

It is another object of the invention to provide novel factice-like products containing phosphorus.

These and other objects and advantages of the invention will become obvious from the following detailed description.

The process of the invention for the preparation of novel factice-like products containing phosphorus comprises reacting oxidized polymers of an ester of a polyvalent alcohol with an acid selected from the group consisting of unsaturated fatty acids of 8 to 22 carbon atoms, resinic acids and mixtures of the said acids with an anhydrous phosphorus halide to obtain a factice-like product containing phosphorus. If desired, the reaction may be effected in the presence of an organic solvent.

Examples of suitable phosphorus halides for the process of the invention are phosphorus trichloride, phosphorus tribromide, phosphorus pentachloride, phosphorus pentabromide, phosphorus oxychloride, phosphorus oxybromide, phosphorus thiochloride and phosphorus thiobromide and mixtures thereof. Phosphorus trichloride is preferred as it results in light-colored reaction products. The weight ratio of oxidized polymerized ester to phosphorus halide may be as high as 1:2 but is preferably 1:0.05 to 1:0.5.

Examples of suitable esters used to form the oxidized polymerized esters for reaction with the phosphorus halide are glycol esters, triglycerides or esters of other polyvalent alcohols such as pentaerythrite, pentite and hexite with unsaturated natural or synthetic fatty acids and hydroxy fatty acids of 8 to 18 carbon atoms and resinic acids such as oleic acid, ricinoleic acid, linoleic acid, pimaric acid, sapinic acid, colophonic acid, abietic acid, etc. Natural drying, semi-drying and non-drying oils are preferably used. Examples of said oils are linseed oil, rapeseed oil, soybean oil, peanut oil, safflower oil, cottonseed oil, sunflower oil, tall oil, tung oil, fish oils, etc., and especially castor oil which yields relatively light colored products. Mixtures of said esters can also be used.

The polymerization of the said esters can be effected in a known manner by heating the esters at temperatures of at least 80° C, preferably 100° to 350° C, in the presence or absence of catalysts.

The oxidation of the polymerized ester may be effected simultaneously with the polymerization or subsequent to the polymerization. The oxidation may be effected with the usual oxidizing agents such as air, oxygen, hydrogen peroxide and other organic and inorganic peroxy compounds, alkali metal and alkaline earth metal chlorites, hypochlorites, chlorates, perchlorates, permanganates and oxygen containing nitrogen compounds, etc. The amount of oxygen to be used is 0.2 to 2 moles, preferably 0.5 to 1.5 moles, per mole of the unsaturated acid.

Air is the preferred oxidizing agent due to its low cost and because it leaves no residue in the final product. It is particularly advantageous to "blow" the natural oils by heating them at temperatures between 100° and 300° while bubbling a stream of air or oxygen therethrough until the desired degree of viscosity is obtained which results in a simultaneous polymerization and oxidation of the oils. If desired, small amounts of oxidation or polymerization accelerators, so-called siccatives, such as oil-soluble lead, manganese, cobalt and iron compounds, can be added before the blowing of the oils. Even in the absence of air, polymerized oils, such as stand oil, can be oxidized by a subsequent treatment with any one of the said oxidation agents, using elevated temperatures if desired.

Polymerization and oxidation of the esters are accompanied with an increase in viscosity. It is advisable to continue the polymerization or oxidation until the viscosity of the ester at a temperature of 20° C is at least 1,000 cP, preferably 1,500 cP and more. Polymerization temperatures and duration of polymerization depends on the desired viscosity or hardness of the end products. Low viscosity esters lead, as a rule, to viscous products and higher viscosity esters lead to rubbery elastomers up to solid factice-like products. If the fatty acid or resinic acid esters treated in the described manner still contain substances which react with phosphorus halides, they are subsequently removed in the usual manner, such as by heating under vacuum.

The addition of the phosphorus halides to the oxidized polymerized esters may be carried out in a vessel equipped with a stirrer or in a kneading device made of stainless steel at room temperature. The mixing can be done in individual batches or continuously. The reaction starts immediately with heat generated. It is advisable to add the phosphorus halides in such amounts that the mixture does not become heated above the boiling point of the phosphorus halides, or if desired, to cool the mixture. While the phosphorus halide is being added, the reaction medium is thoroughly admixed or kneaded. The process can also be effected in that first, a portion of the oxidized polymerized ester is reacted with the total calculated amount of phosphorus halide, for example in a proportion of 3:1 to 1:2 by weight, and then this product is admixed with more oxidized, polymerized ester. When starting in the first step of operation with an ester having a relatively low degree of polymerization and only slightly increased viscosity, liquid intermediate products are formed. These are easily admixed, in the second step, with more esters, which can have a higher degree of polymerization effecting the reaction to form factice-like masses. In this working method, the reaction between phosphorus halide and oxidized polymeric ester proceeds less intensively and therefore can be more easily observed or controlled.

Moreover, the reaction can be effected in the presence of solvents such as hydrocarbons, chlorohydrocarbons, low-molecular ethers, ketones or esters. The polymerized and oxidized ester as well as the phosphorus halide can be dissolved in solvents. However, considerable amounts of the solvents are present during the production of the product. By using these diluents, frequently an end product is obtained, which can be easily reduced to small particles.

The factice-like products produced by the process of the invention are suitable as additives to caoutchouc mixtures, lacquers, synthetic polymers, adhesives and lubricants. They exhibit a very high decomposition point and they possess, in contrast to sulfur factices, excellent fire resistant properties due to their phosporus content. Depending on the selection of the starting materials, of the degree of oxidation or polymerization and of the amount of the phosphorus halides, the said products can be prepared in the form of viscous oils or of solid, elastic or resinous batches and can be adapted to the respective utilization.

In the following examples, there are described several preferred embodiments to illustrate the invention. However, it should be understood that the invention is not intended to be limited to the specific embodiments.

EXAMPLES I to XIII

The oils used in the examples as starting materials were dried by heating briefly at a temperature of 80° to 100° C under vacuum. The oils were then heated at the polymerization temperature for the period of time specified in Table I while bubbling therethrough a finely divided current of dry air with a glass frit. The air supplied to the reaction mixture was 120 to 180 liters of air per kg of oil per hour, except in Example VI, where the air flow was drastically reduced to 15 liters of air per kg of oil per hour. Also, the reaction in Examples X, XI and XII was effected in the presence of cobalt napthalene and the percent in column 2 of Table I indicates the amount of cobalt used based on the weight of the oil.

The phosphorus halide indicated in the table was added to the oxidized polymerized oils, cooled to room temperature with vigorous stirring. The acid and hydroxyl numbers and viscosities in cP at 20° C of the esters given in the pertinent columns of Table I were based on the weight of polymerized oil. Furthermore, Table I contains data pertaining to phosphorus and chlorine contents of the end product as well as regarding its physical properties.

with (a) 500 ml of acetone or (b) 500 ml of trichloroethylene. During the reaction, the solvent was taken up by the polymers and solid, yellow adherent resins resulted, which could easily be reduced to small particles.

EXAMPLE XV

A stand oil having a viscosity of 3,600 cP at a temperature of 20° C was prepared by heating linseed oil for 3 hours at 290° C in the absence of air. This product did not react with $PCl_3$, $PCl_5$ or $POCl_3$. 130 gm of 60 percent $H_2O_2$ were gradually added over a period of 2 hours to 500 gm of the said stand oil while stirring at a temperature of 100° to 120° C. After the oxidized polymerized oil had been dried under vacuum, 78.5 gm of $PCl_3$ were added with stirring to obtain a yellow solid and non-adherent resin, having a phosphorus content of 3.0 percent and a chlorine content of 2.9 percent.

EXAMPLE XVI

Dry air was allowed to bubble through the stand oil prepared in Example XV over a period of 36 hours at a temperature of 150° C, as described in Example I. After stirring 15.7 gm of $PCl_3$ into 100 gm of the said oil, a yellow viscous non-adhesive resin haVing a phosphorus content of 3.1 percent and a chlorine content of 3.6 percent was obtained.

EXAMPLE XVII 100 gm of the viscous oil, obtained as described in Example VI, were admixed with stirring with 300 gm of a polymerized castor oil which as described in Example II was prepared by allowing a current of air to bubble therethrough for 11 hours at 150° C to obtain a yellow, non-adhesive, elastic resin having a phosphorus content of 2.8 percent.

Various modifications of the process and products of the in-

TABLE I

| Starting material | Polymerization | | | Oxidized polymers | | | Phosphorus halide used in parts by weight | End Product | | |
|---|---|---|---|---|---|---|---|---|---|---|
| | Hrs. | Percent Co | ° C. | Acid No. | Hydroxy No. | Viscosity (cp.) | | Percent P | Percent Cl | Properties |
| 1.... Castor oil | 8 | | 150 | 4.1 | 167 | 1,200 | 15.7 $PCl_3$ | 3.06 | 3.72 | Solid, yellow, adhesive. |
| 2........do | 11 | | 150 | 4.1 | 166 | 2,000 | 15.7 $PCl_3$ | 3.06 | 3.48 | Solid, yellow, dry. |
| 3........do | 11 | | 150 | 4.1 | 166 | 2,000 | 31.4 $PCl_3$ | 5.4 | 3.82 | Viscous, yellow. |
| 4........do | 64 | | 150 | 7.4 | 131 | 105,000 | 15.7 $PCl_3$ | 3.06 | 2.54 | Solid, light brown, dry. |
| 5........do | 64 | | 150 | 7.4 | 131 | 105,000 | 96 $PCl_3$ | 11.1 | 3.04 | Solid, light brown, adhesive. |
| 6........do | 60 | | 150 | 2.6 | 159 | 2,600 | 96 $PCl_3$ | 11 1 | 3.18 | Light brown, dissolved when exposed to air. |
| 7........do | 60 | | 137 | 6.3 | 137 | 16,000 | 30 $PCl_5$ | 3.4 | 4.50 | Solid, brown dry. |
| 8........do | 64 | | 150 | 7.4 | 131 | 105,000 | 16.7 $POCl_3$ | 2.9 | 5.10 | Solid, black, dry. |
| 9........do | 64 | | 150 | 7.4 | 131 | 105,000 | 100 $POCl_3$ | 10.1 | 8.85 | Do. |
| 10........do | 6 | 0.5 | 240 | 7.8 | | (*) | 2 $PCl_3$ | 2.0 | 1.48 | Solid, brown, adhesive. |
| 11... Rapeseed oil | 8 | 0.1 | 290 | 3.3 | | (*) | 31.4 $PCl^3$ | 5.4 | 3.67 | Do. |
| 12... Soybean oil | 65 | 0.1 | 150 | 6.3 | 39.7 | 3,200 | 15.7 $PCl_3$ | 3.06 | 4.35 | Do. |
| 13... 3 parts linseed oil plus 1 part castor oil. | 60 | | 150 | 6.5 | 64 | (*) | 15.7 $PCl_3$ | 3.06 | 2.54 | Solid, yellow, dry. |

* Highly viscous.

The final resins, which were extensively pulverized in a spinning stirrer while being stirred, had a certain odor of phosphorus halides still adhering to them and were spread out in a thin layer whereupon the odor disappeared in a short time. In a still shorter time, the last traces of the phosphorus halides could be removed by treating the pulverized resin with a current of air.

The products obtained in Examples I, II, IV, V and VII to XIII were solid, viscous masses containing between 10 and 45 percent of components soluble in organic solvents such as acetone, ethanol or trichlorethylene. The determination of these soluble parts consisting of low-polymer material was obtained as in the factice test by an 8-hour extraction in the Soxhlet extractor.

EXAMPLE XIV

The process of Example IV was repeated twice except prior to the addition of $PCl_3$, 300 gm of the blown oil were diluted vention may be made without departing from the spirit or scope thereof.

We claim:

1. A process for the preparation of factice-like products containing phosphorus which comprises reacting phosphorus trichloride at a temperature not above the boiling point of phosphorus trichloride with an oxidized polymer of at least one triglyceride of an unsaturated fatty acid of eight to 22 carbon atoms polymerized by heating above 80° C while bubbling air therethrough, said polymer having a viscosity of more than 1,000 cP at 20° C and the weight ratio of oxidized polymer to phosphorus trichloride being 1:0.05 to 1:0.5.

2. The process of claim 1 wherein the oxidized polymers have a viscosity of more than 1,500 cP at 20° C.

3. The process of claim 1 wherein the oxidized polymer is castor oil polymerized by heating above 80° C while bubbling air therethrough.

4. The factice-like product produced by the process of claim 1.

* * * * *